United States Patent [19]

Zhang

[11] Patent Number: 5,250,374
[45] Date of Patent: Oct. 5, 1993

[54] METHOD OF PREPARING A RECHARGEABLE MODIFIED MANGANESE-CONTAINING MATERIAL BY ELECTROLYTIC DEPOSITION AND RELATED MATERIAL

[75] Inventor: Chaojiong Zhang, College Station, Tex.

[73] Assignee: RBC Universal, Bryan, Tex.

[21] Appl. No.: 645,984

[22] Filed: Jan. 24, 1991

[51] Int. Cl.$^5$ .................. H01M 4/50; C25B 1/06
[52] U.S. Cl. .................. 429/224; 429/218; 429/225; 429/228; 204/96; 204/114
[58] Field of Search .............. 204/96, 114; 429/224, 429/225, 228, 227, 218

[56] References Cited

U.S. PATENT DOCUMENTS

| | | |
|---|---|---|
| 1,293,463 | 2/1919 | Kaplan . |
| 3,438,878 | 4/1969 | Bell et al. .............. 204/83 |
| 3,533,740 | 10/1970 | Grund et al. . |
| 3,535,217 | 10/1970 | Amano et al. .............. 204/96 |
| 3,723,265 | 3/1973 | Preisler et al. .............. 204/96 |
| 3,773,916 | 1/1972 | Preisler et al. . |
| 3,948,684 | 4/1976 | Armstrong . |
| 4,006,217 | 2/1977 | Faber et al. . |
| 4,048,027 | 9/1977 | Senderoff .............. 204/61 |
| 4,072,586 | 2/1978 | De Nora et al. .............. 204/105 |
| 4,133,856 | 1/1979 | Ikeda et al. . |
| 4,170,527 | 10/1979 | Beer et al. .............. 204/96 |
| 4,269,691 | 5/1981 | Deborski . |
| 4,277,360 | 7/1981 | Mellors et al. . |
| 4,295,942 | 10/1981 | Tomov et al. .............. 204/96 |
| 4,362,791 | 12/1982 | Kaneko et al. . |
| 4,405,699 | 9/1983 | Kruger . |
| 4,451,543 | 5/1984 | Dzieciuch et al. .............. 429/206 |
| 4,476,104 | 10/1984 | Mellors .............. 423/605 |
| 4,520,005 | 5/1985 | Yao .............. 423/599 |
| 4,728,586 | 3/1988 | Venkatesan et al. . |
| 4,863,817 | 9/1989 | Ogino et al. .............. 429/194 |
| 4,992,149 | 2/1991 | Nguyen .............. 204/114 |
| 4,997,531 | 3/1991 | Yoshio et al. .............. 204/96 |

FOREIGN PATENT DOCUMENTS

| | | | |
|---|---|---|---|
| 0814412 | 6/1969 | Canada .............. | 204/96 |
| 1383943 | 2/1975 | United Kingdom .............. | 204/96 |

OTHER PUBLICATIONS

K. Kordesch, et al. Electrochemica Acta, 26, 1495 (1981).

*Primary Examiner*—Anthony McFarlane
*Attorney, Agent, or Firm*—Arnold B. Silverman; Rita M. Rooney

[57] ABSTRACT

A method of making a rechargeable modified manganese-containing material is disclosed. The method includes mixing manganese nitrate with a doping material which may be a nitrate of a second metal and placing this mixture in an aqueous solution. Electrodes are then submerged in the solution and a current is passed through the electrodes to electrolyze the solution. This results in an electrolytic deposition of a first material on the cathode and a second material on the anode. The material deposited on the cathode is a rechargeable modified manganese-containing material in the discharge state. The material deposited on the anode is a modified manganese-dioxide material in the charged state. A battery employing the modified manganese-containing material is also disclosed.

45 Claims, 6 Drawing Sheets

METHOD OF PREPARING A RECHARGEABLE MODIFIED MANGANESE-CONTAINING MATERIAL BY ELECTROLYTIC DEPOSITION AND RELATED MATERIAL

BACKGROUND OF THE INVENTION

1. Field of the Invention

This invention relates to a method of electrolytically preparing a rechargeable modified manganese-containing material, as defined herein.

2. Background of the Invention and Description of the Prior Art

Materials for battery electrodes which have the capability of being recharged are of increasing usefulness in today's society due to the effort being made to develop energy alternatives. These efforts have resulted from increased awareness of environmental threats presented by use of conventional fossil fuels and depletion of resources of such fuels. In addition, certain fuels are impractical or impossible to use in applications such as space travel and satellites. Moreover, electric energy sources which are rechargeable such as rechargeable battery cells obviate the need for continuously replacing non-rechargeable cells which have been exhausted. Such energy sources are particularly useful as backups for solar energy systems.

A material which has dominated the primary "throw away" battery since the early 1950's is =modified form of manganese dioxide. This modified manganese dioxide is a high energy, low-cost material. As such, many processes have been tried to bring long life rechargeability to this material. For example, a method of making a birnessite compound which included one type modified manganese dioxide compound was disclosed in U.S. Pat. No. 4,520,005. The method disclosed is a batch method which is not suitable for use on a large scale in commercial applications. Additionally, U.S. Pat. No. 4,451,534 discloses a battery cell which includes a positive electrode composed of a modified manganese dioxide compound. The modified manganese dioxide compound disclosed in the patent is mixed with a percentage of bismuth, lead or mixtures thereof. The cell also includes a zinc negative electrode. Furthermore, the material disclosed can only be made in small batches over a 12 to 24 hour period. The amount of product developed during a relatively lengthy preparation time is generally unacceptable for any commercial application. In addition, the material disclosed in the two aforementioned patents has to cycle with a suitable anode. As noted, zinc is the preferred anode yet it has problems cycling because soluble zinc (zincate) in the electrolyte chemically reacts with the anode material yielding a non-rechargeable mixed anode.

Some of these types of methods have resulted in a rechargeable material. The materials show rechargeability on the order of about 250 cycles, but a continuous drop in capacity occurs as the number of cycles increases.

A method of producing traditional manganese dioxide, as opposed to a modified manganese dioxide material were disclosed in U.S. Pat. No. 3,535,217. The method disclosed includes using a chloride solution to produce electrolytic, anodic manganese dioxide. The method is suitable for treating naturally-occurring manganese ores. The resulting material is useful in dry cells, however, it is not rechargeable material. U.S. Pat. No. 4,048,027 discloses a method of producing electrolytic manganese dioxide from molten manganese nitrate hexahydrate. Higher current densities used in this method allow higher yields of depolarized material. Improved performance in dry cells is stated to be an advantage. Again, this involves traditional manganese dioxide.

Methods have been developed for ease of removal of electrolytically produced manganese dioxide powder. See U.S. Pat. Nos. 4,170,527 and 4,295,943.

Other uses of manganese dioxide have been known such as use of manganese dioxide as a catalytic coating for oxygen evolution electrodes. See U.S. Pat. Nos. 4,072,586 and 4,476,104. U.S. Pat. No. 4,863,817 discloses a method of making electrolytic gamma-$MnO_2$ involving stirring the solution with a gas.

Manganese dioxide prepared by the prior art electrolytic methods mentioned hereinbefore is used generally in primary alkaline manganese dioxide-zinc cells. The cells are typically made in a charged state and then discarded. The use of the manganese dioxide-zinc system is limited to primary cells because the manganese dioxide material produced is not fully rechargeable. Although some rechargeability can be achieved, the capacity significantly reduces with each successive cycle. This is particularly true if the material has been deep discharged, as would be understood by those skilled in the art to be greater than about fifty percent of the theoretical two-electron capacity.

It has been shown that electrolytic manganese dioxide may be recharged in the range of 100 times, if it is discharged to less than about thirty percent of the theoretical one electron capacity, or less than about fifteen percent of the theoretical two electron capacity. See K. Kordesch, et. al., *Electrochemica Acta*, 26, 1495 (1981). However, the restriction of shallow discharge does limit the amount of energy which can be generated by such cells, and thus reduces rechargeability of the cells.

There remains a need, therefore, for a method of making a highly rechargeable modified manganese dioxide material which can be produced on a commercial scale in a feasible amount of time. There remains a further need for a method of making rechargeable modified manganese dioxide using an electrolytic process.

SUMMARY OF THE INVENTION

These and other needs are satisfied by the method of the present invention in which a method of electrolytically producing a rechargeable modified manganese dioxide material compound and the resultant compound and a battery cell incorporating the compound are disclosed. The method includes the steps of placing manganese nitrate in an aqueous solution. A comparatively small, predetermined percentage of a doping material such as, for example, lead nitrate, bismuth nitrate, copper nitrate or mixtures thereof is then added to the solution. Two electrodes are immersed into the solution. The electrodes are preferably composed of graphite, graphite powder, nickel or other materials hereinafter discussed. Both electrodes may be composed of the same material, or they may be composed of different materials. An electric current is passed through the electrodes and a modified manganese-containing compound is electrolytically deposited onto both the anode and the cathode. The material deposited onto the anode includes manganese in the $Mn^{4+}$ oxidation state which is the charged state. The material which is deposited onto the cathode is in the $Mn^{2+}$ oxidation state which is the discharge state. In this way, two materials can be simultaneously produced, one in the charged state and the other in discharged state. The materials produced are highly rechargeable in that a given capacity is maintained throughout a number of successive cycles. This is as compared to prior art methods in which some level of rechargeability is achieved, yet, as the material is cycled, the capacity is substantially diminished from cycle to cycle.

The process of the present invention provides a compound which is highly rechargeable and has high energy density. The associated battery which is disclosed has a greatly increased cycling capacity over know rechargeable batteries.

It is an object of the present invention to provide a method of producing a modified manganese dioxide as well as other manganese-containing materials. The method can be used to produce a compound in either a charged state or a discharge state. Additionally, the method includes a process for simultaneously generating the material in both states.

It is another object of the invention to provide a method of making a modified manganese dioxide material in a manner which can be economically used for rechargeable batteries on a large scale.

It is a further object of the invention to provide a method of producing a modified manganese dioxide material compound which has high energy density.

It is a further object of the invention to provide a method of producing a modified manganese dioxide compound which is highly rechargeable and capable of being manufactured on a commercial scale.

These and other objects of the invention will be more fully understood from the following description of the invention with reference to the illustrations appended hereto.

DESCRIPTION OF THE PREFERRED EMBODIMENTS

This invention is directed towards a method of making a rechargeable "modified manganese-containing compound" for use, primarily, in rechargeable battery cells. As used herein, the terms "modified manganese-containing compound" and/or "modified manganese dioxide material" include mixtures of manganese dioxide or manganese hydroxide with another material which may be bismuth, lead, copper, or mixtures of oxides thereof, or other metals whose oxides show stability in alkaline electrolytes and which possess redox behavior in the potential of modified manganese dioxide. Such a potential would be about $-0.2$ V to $-0.6$ V with reference to a Hg/HgO reference electrode.

Figure 1:
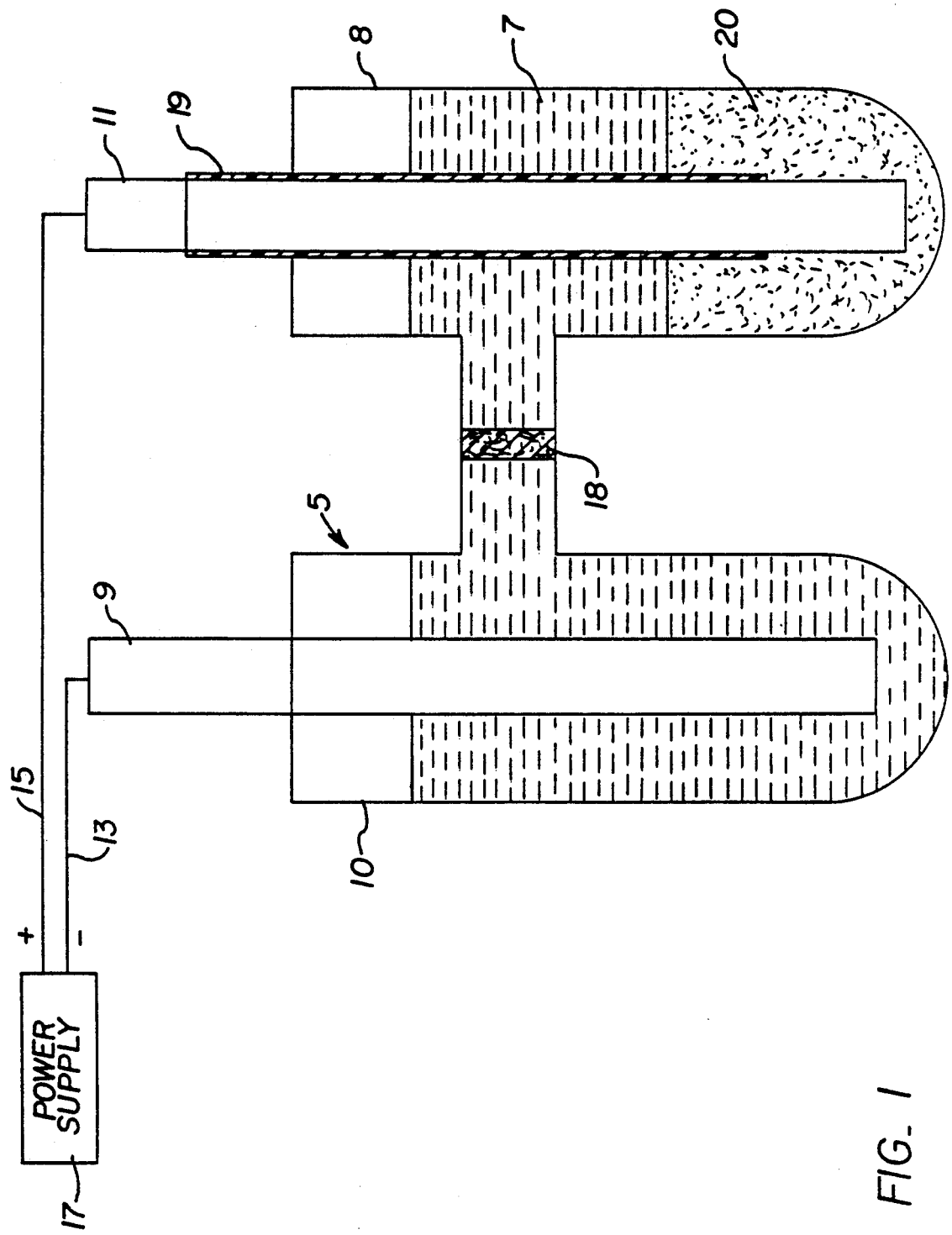
FIG. 1 is a schematic cross-sectional illustration depicting a system used in practicing the method of invention.

The method of the present invention may be best understood with reference to FIG. 1. The method includes providing a container 5 which may be composed of glass or plastic which has an aqueous electrolyte solution 7 therein. Container 5 preferably has an anodic portion 8 and cathodic portion 10. The electrolyte solution 7 contains distilled water, manganese nitrate, $Mn(NO_3)_2$ and a second material which is a doping material selected from the group consisting of lead nitrate, $Pb(NO_3)_2$, or bismuth nitrate, $Bi(NO_3)_2$, mixtures of $Pb(NO_3)_2$ and $Bi(NO_3)_2$, copper nitrate $Cu(NO_3)_2$, copper sulfate or lead acetate and/or nitric acid or mixtures of any two or more of the aforementioned compounds. It is preferred to provide about 1 to 10M manganese nitrate and about 0.1 to 0.01M of the second material. The preferred range of the percentage of the second material in the mixture is preferably between about 0.1 to 5% on a molecular weight ratio basis.

Two electrodes, namely cathode 9 and anode 11, are submerged into the aqueous solution 7 in container 5. The electrodes may be composed of a material selected from the group consisting of carbon, graphite, nickel, sintered rod nickel, titanium, lead or other materials. It is presently preferred to use graphite rods for both the cathode 9 and anode 11. An insulator 19 may also be provided on anode 9. The two electrodes 9 and 11 are placed in the aqueous bath and are connected by wires 13 and 15, respectively, to a suitable power supply 17. Power supply 17 may be a potentiostat, a galvanostat or a DC power supply. Current is passed through cathode 9 and anode 11 as discussed in greater detail hereinafter. In accordance with yet another preferred aspect of the invention, graphite powder 20 may be provided in anodic portion 8 of container 5. Graphite powder 20 is used as a current collector and a substrate upon which the material discussed hereinafter may be deposited. It may also be preferred in this application or in others to provide a separator 18 to block any graphite powder from passing into cathode portion 10 of container 5.

As noted hereinbefore, during electrolysis, current is passed through the electrodes 9 and 11. The current passed through the electrodes is preferably between about 0.1 ma/cm² and 200 ma/cm² and would preferably be between about 1 ma/cm² and 100 ma/cm². This current is applied for between about 1 and 170 hours and preferably for about 10 to 33.3 hours. The current level is chosen based upon the application in which the method is to be utilized. A higher current results in a greater amount of material being produced per unit time. Conversely, at a given current, an extension of time during which the electrodes are exposed to the current results in a greater yield of material produced.

As the aqueous solution is electrolyzed a coating is obtained on both cathode 9 and anode 11. At anode 11 the material formed is in the charged state. Specifically, during anodic deposition $MnO_2 \bullet PbO_2$ is formed, if for example, lead nitrate is used as the doping material. In that case, the reaction at the anode 11 is as follows:

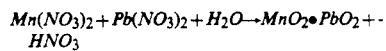

$$Mn(NO_3)_2 + Pb(NO_3)_2 + H_2O \rightarrow MnO_2 \bullet PbO_2 + HNO_3$$

If bismuth is used as the second material, then $MnO_2 \bullet Bi_2O_3$ is formed at anode 11. The manganese in this material is in the +4 oxidation state which is the charged state.

At cathode 9, the material obtained is in the discharge state. More specifically, during cathodic deposition, $Mn(OH)_2 \bullet Pb(OH)_2$ is formed if, for example, lead oxide was used as the second material. In such a case, the reaction at cathode 9 is as follows:

$$Mn^{2+} + Pb^{2+} + 4H_2O + 4e \rightarrow Mn(OH)_2 \bullet Pb(OH)_2 + 2H_2$$

Alternatively, $Mn(OH)_2 \bullet Bi(OH)_3$ is formed if bismuth is used as the doping material referred to hereinbefore. If combinations of lead or bismuth oxides are used, $Mn(OH)_2 \bullet Pb(OH)_2 \bullet Bi(OH)_3$ is formed. If another material is used this would, of course, affect and determine the material generated during cathodic and anodic deposition. For example, if copper nitrate is added to the electrolyte, the copper oxides will be formed at the anode with the $MnO_2$ and corresponding hydroxides will form at the cathode. This cathodically produced compound may be used as a modified manganese-containing material for a positive electrode in the discharge state in a battery cell. The oxidation state of the manganese in this discharge state is +2. That is, during cathodic deposition $Mn^{2+}$ is generated.

The electrolysis is preferably carried out at room temperature which is between about 65 to 75 degrees F. The electrolysis is carried out at normal atmospheric pressure. It is significant to note that the electrolysis of the present invention can be employed at room temperature because conventional methods require the electrolysis to be carried out at temperatures of at least 180 degrees F. The method of the present invention represents an energy savings and simplification over conventional electrolysis methods.

After the electrolysis is carried out if it is performed on graphite rods, the materials at the cathode and the anode are scraped off the rods and are then washed to remove salts and dried. If, on the other hand, the material is deposited in graphite powder, then it may be used as is. The resulting material can be used in industrial applications in which rechargeable materials are required.

If desired, a reference electrode (not shown) can be used in order to study the performance of either cathode 9 or anode 11. Specifically, a mercury/mercury-oxide electrode may be used. Alternatively, Ag/AgCl or other reference electrodes suitable in the application may be used. With a reference electrode it is possible to determine what is happening at the cathode 9, for example, by measuring the voltage of cathode 9 versus the reference electrode. Similar such information can be determined about anode 11 by measuring the voltage with respect to the reference electrode.

It should be understood that the method of the present invention can be employed on a very large scale using materials which are already used in the industry in the preparation of conventional manganese dioxide material for use in battery cells. As stated hereinbefore, the conventional method generally provides for starting with manganese sulphate and operates at 180 degrees F. However, the conventional manganese dioxide is essentially not rechargeable to a reliable extent as significant degradation in capacity occurs from cycle to cycle. The present invention provides a method of generating rechargeable modified manganese dioxide in a manner which can easily be employed using materials and devices which are known in the industry.

It should be understood that this method is simple and requires only a comparatively short time to produce the material. In addition, both cathodic and anodic depositions can be carried out simultaneously to generate a higher yield of rechargeable material. For use in industry, the material which is created in the charged state can be converted to the discharge state before being supplied on a commercial basis, if desired.

In order to refine the disclosure of the invention several illustrative examples will be considered.

EXAMPLE 1

About 2M of manganese nitrate was mixed with about 0.1M of lead nitrate. This mixture was placed in a container 5 composed of stainless steel, plastics, glass or any chemically inert material containing 100 ml of distilled water. Two graphite rod electrodes 9 and 11 of dimensions of about 15 cm (length)×0.5 cm (diameter) were immersed into the aqueous bath. The electrodes 9, 11 were connected by a suitable conductive wire supplied with a current from a suitable power supply such as a DC power supply or a galvanostat. A current of about 2 ma/cm² to 20 ma/cm² was passed through the electrodes 9 and 11 for at least about 16.67 hours. After this time period, the graphite electrodes were removed from the solution and rinsed by soaking in $H_2O$ to remove excess $Mn(NO_3)_2 \bullet Mn_x(NO_3)_y$ which may remain after electrolysis. The materials deposited on the electrodes were then removed, dried and stored.

EXAMPLE 2

The conditions for depositing the active material in this example were as follows: an electrolyte 7 composed of about 20 ml of the following was used: about 5M $Mn(NO_3)_2$, and about 0.05M $Pb(NO_3)_2$, and about 0.2M $HNO_3$. The anode 11 was composed of a graphite rod in about 4 grams of graphite powder 20. Cathode 9 was a graphite rod. The current applied was at least about 20 ma for at least about 60 hours.

Figure 2:
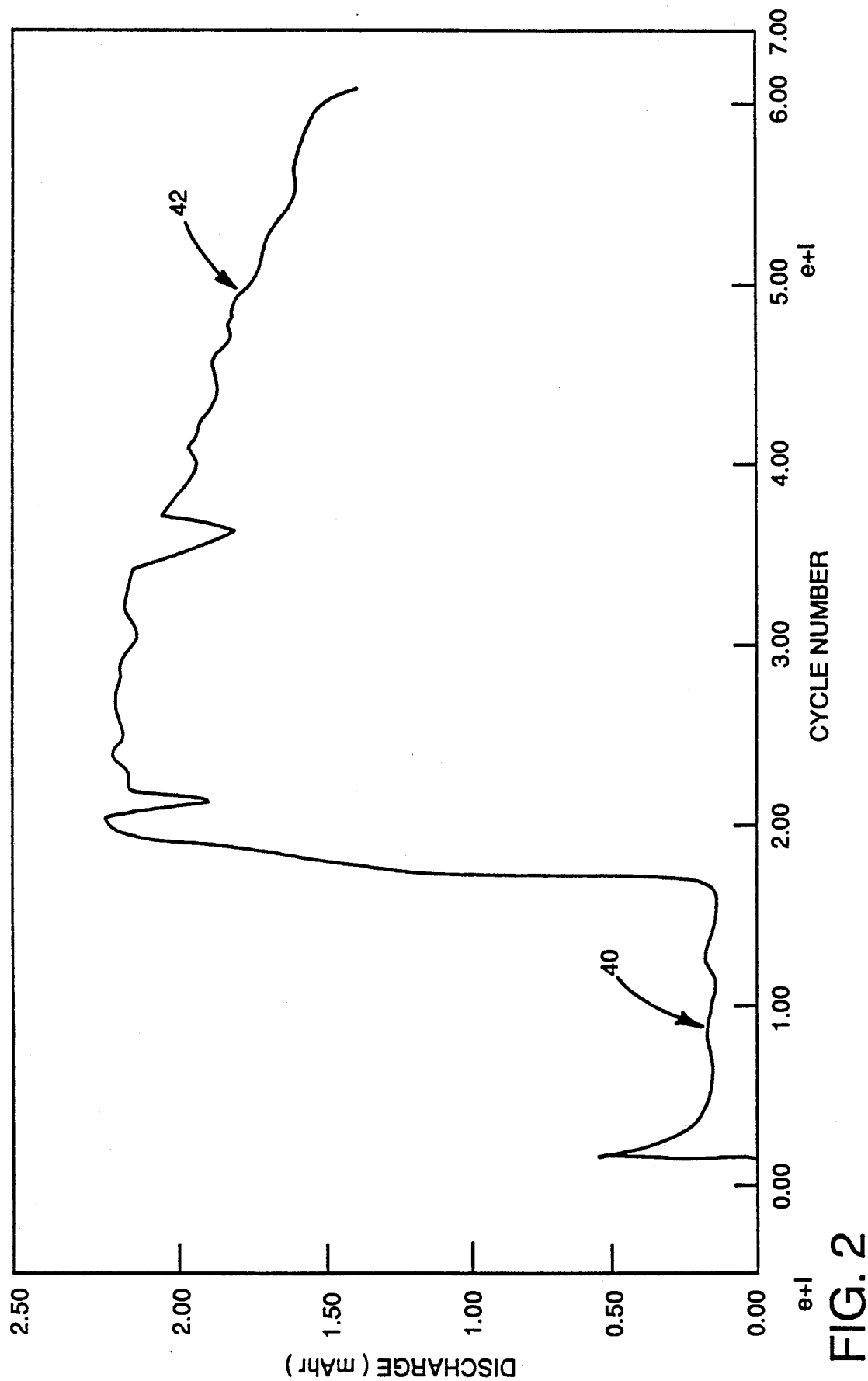
FIG. 2 is a discharge curve for the $PbO_2 \bullet MnO_2$ material anodically deposited on graphite rod/powder in accordance with the present invention.
Figure 3:
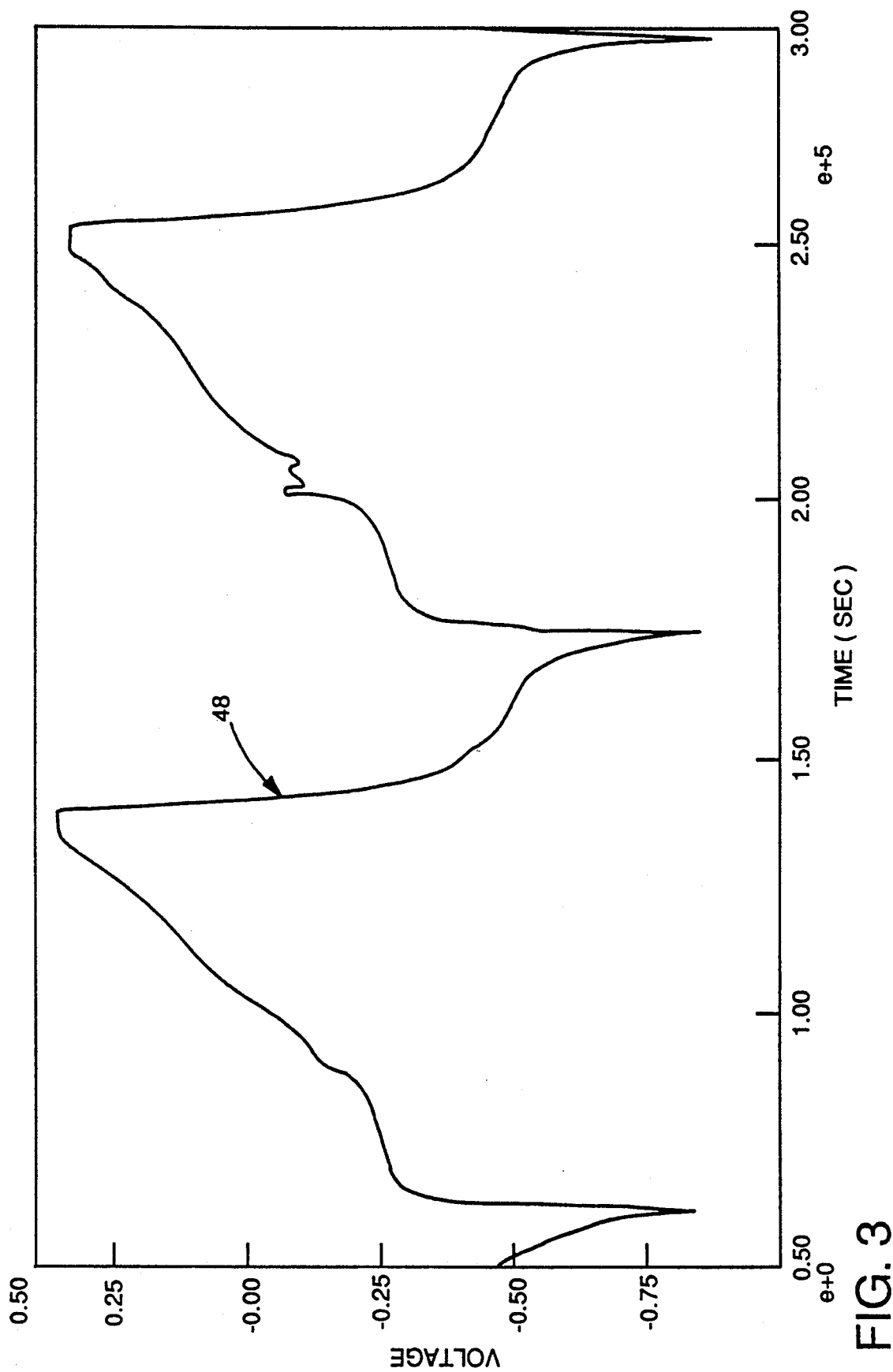
FIG. 3 is a graph depicting the cycling capacity in volts over time of the material of FIG. 2 made in accordance with the method of the present invention.

This produced about 1.5 g of $PbO_2/MnO_2 \bullet$ graphite powder which was then mixed with 0.2 g TEFLON and made into a positive electrode for use in a plexiglass test cell. The cycling results are shown in FIG. 2 and FIG. 3. Referring to FIG. 2, a plot of discharge in milliampere-hours against cycle number is shown. The high voltage charge/discharge region is the area designated by reference character 40 in which the potential was between about −0.35 v to 0.35 v. In this region 40 which was between 0 and 17 cycles, the capacity was low, but constant. At a lower voltage region designated by reference character 42, the potential was between −1.0 v to 0.35 v. In this region, the charge/discharge character is relatively high, which means the ratio of $MnO_2$ versus C is high, which is important for a high energy density battery. FIG. 3 shows curve 48 which is a plot of voltage over time in seconds and indicates the voltage drop during discharge and the recharging of the material.

An important feature of this invention is the use of graphite powder as the substrate for deposition. Conventionally, $MnO_2$ is deposited on to lead, carbon, or other inert substrate, then scraped or vibrated off from the substrate and made into powder. The $MnO_2$ powder is then mixed with graphite powder before being made into an electrode. The direct deposition of active material to the graphite powder in accordance with the present invention has several significant advantages over the prior art. It exhibits good electrical contact between the active material and electrode substrate/current collector, which can reduce the voltage drop through internal resistance. The energy density could be increased by increasing the $MnO_2$/graphite ratio while keeping internal resistance within a desired limitation. There is an even thickness and distribution of the active material along with graphite powder, which will produce even current distribution and hence improve electrode behavior. This aspect of the method also involves simplification of manufacturing procedure. In addition, the extra step of grinding the electrode material and mixing it with graphite powder is avoided when using this aspect of the method of the present invention.

EXAMPLE 3

The conditions for depositing the active material in this example were as follows: an electrolyte 7 composed of about 20 ml of the following solution was used: 3M $Mn(NO_3)_2$, 0.05M $Pb(NO_3)_2$, 0.05M $Bi(NO_3)_2$ and 0.2M $HNO_3$. The anode was a graphite rod and the cathode was also a thick graphite rod. The current applied was at least about 30 ma for at least about 80 hours.

Figure 4:
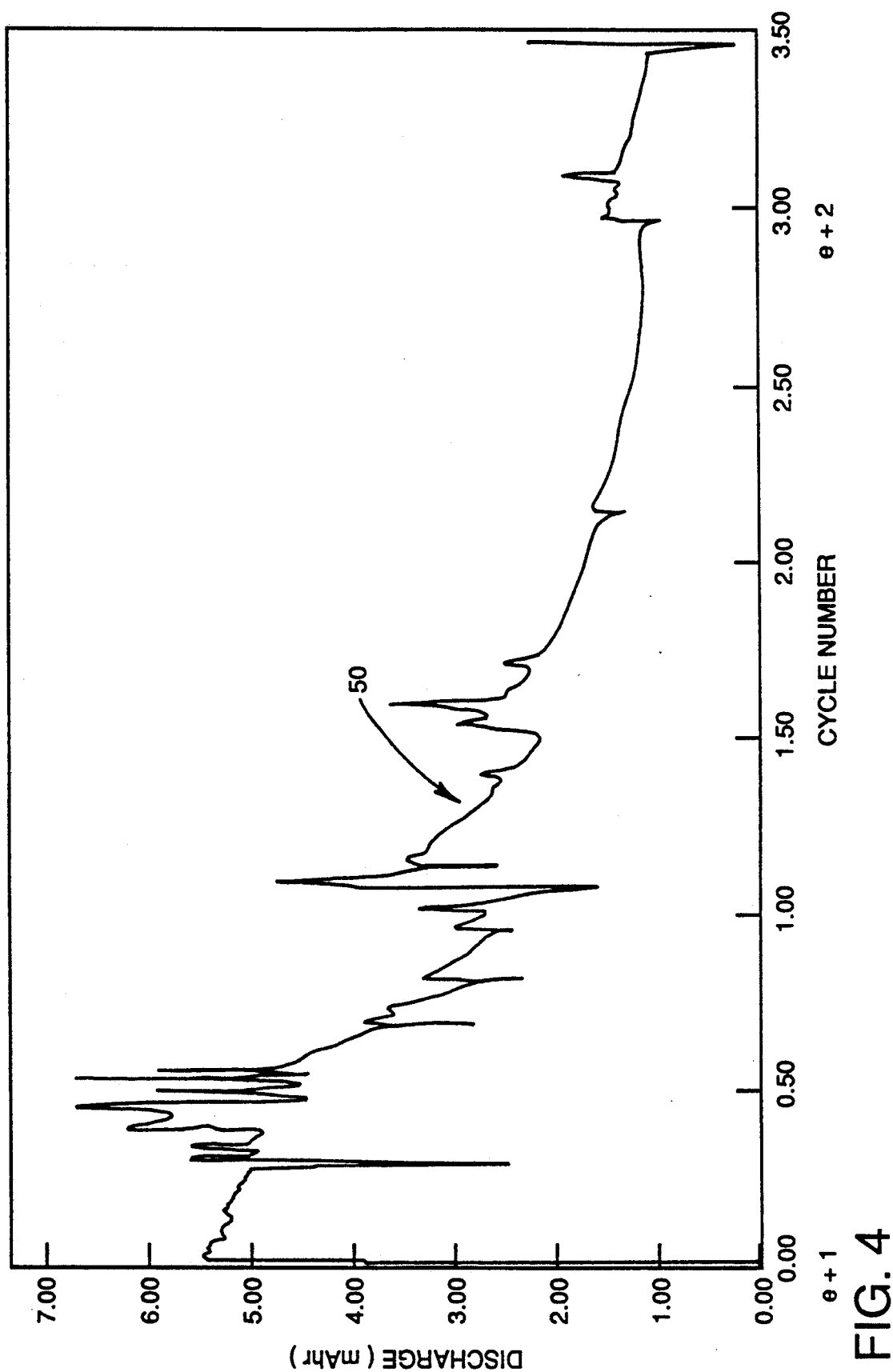
FIG. 4 is a discharge curve for the $PbO_2 \bullet Bi_2O_3 \bullet MnO_2 \bullet$graphite material made in accordance with the present invention.
Figure 5:
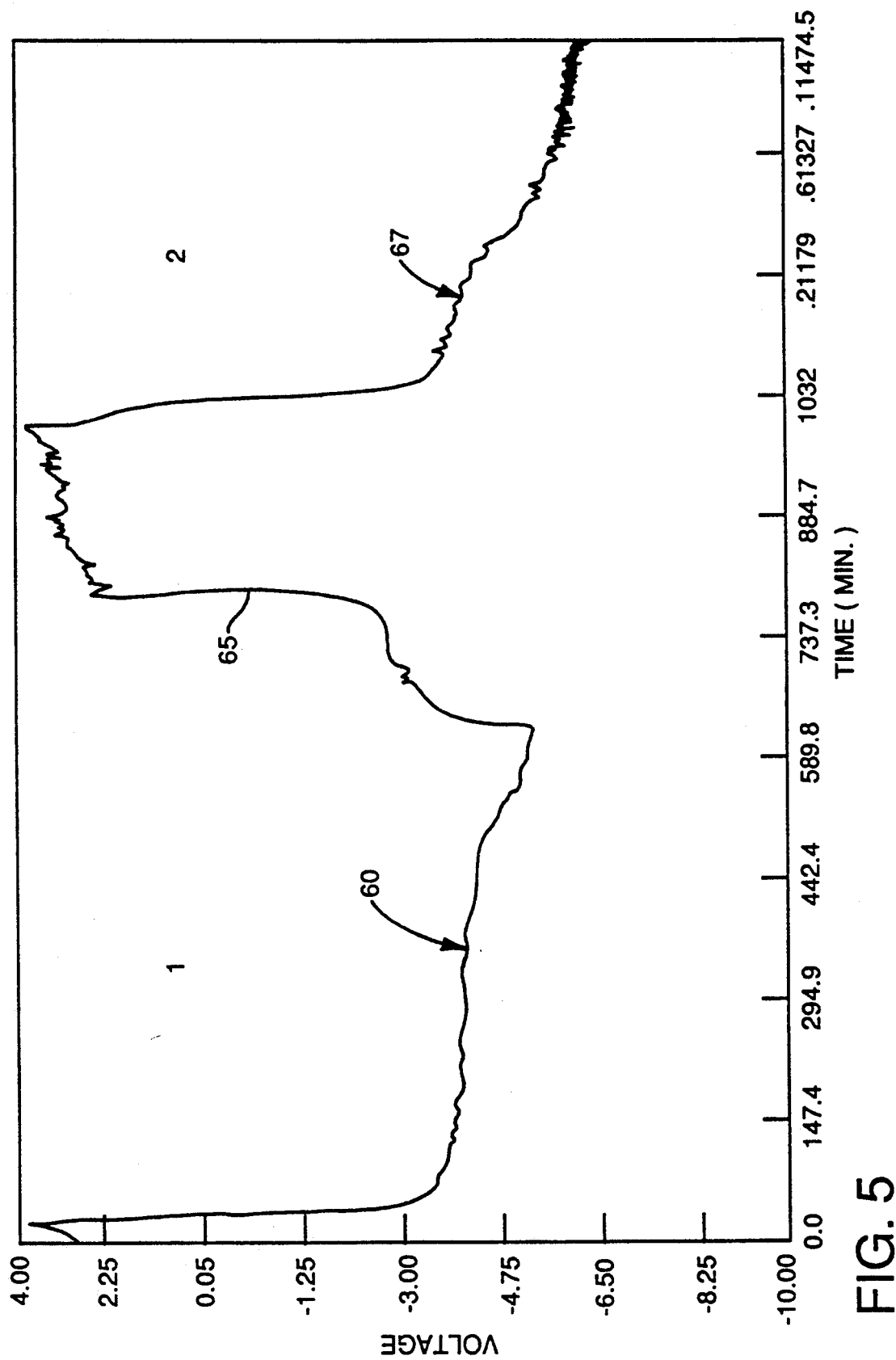
FIG. 5 is a cycling curve for the material of FIG. 4.

This produced about 1.2 g of $PbO_2 \bullet Bi_2O_3 \bullet MnO_2 \bullet$ graphite. This material was mixed with about 0.2 g of TEFLON and a positive electrode for a plexiglass test cell was made from the material. The cycling results are shown in FIGS. 4 and 5. Referring to FIG. 4, a discharge curve 50 is shown for the material made in accordance with this example. The discharge in milliampere-hours is plotted along the ordinate and the cycle number is plotted along the abscissa. As shown in FIG. 4, 350 cycles were performed with little loss in capacity. Referring to FIG. 5, a cycling curve 65 is shown for the first and second cycles of the electrode. Voltage is plotted along the ordinate and time in minutes is plotted on the abscissa. The first cycle is represented by portion 60 of curve 65 and the second cycle is represented by portion 67 of curve 65. It should be noted that a substantially constant voltage applies over a long period of time throughout the first cycle. In the second cycle the same results are found in that a substantially constant voltage occurs throughout the cycle.

EXAMPLE 4

Figure 6:
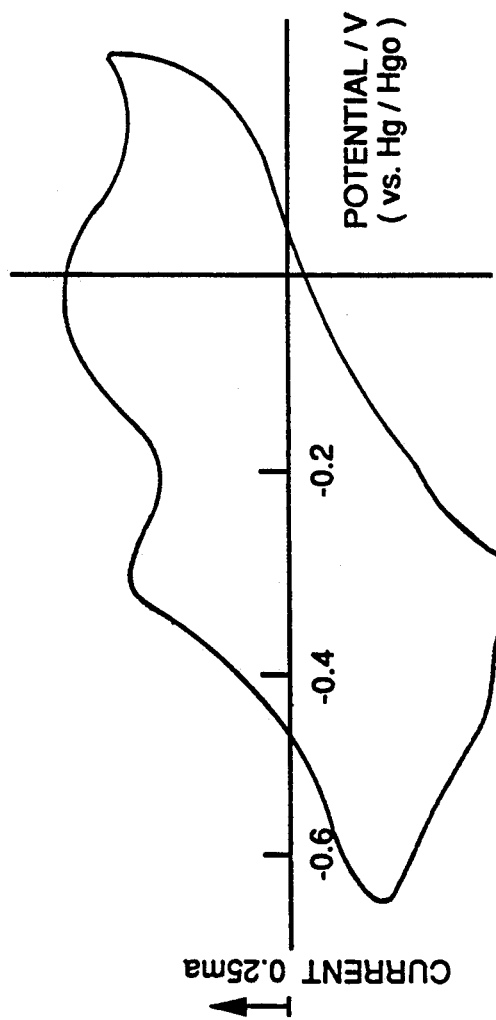
FIG. 6 is a voltammogram curve for the eleventh cycle of cathodically prepared $Mn(OH)_2 \bullet Pb(OH)_2$ in accordance with the method of the present invention.

A mixture of $Mn(NO_3)_2$ and $Pb(NO_3)_2$ was used to deposit a mixture of Mn and Pb oxides onto sintered nickel or nickel wire substrates. A cathodic deposition was carried out using a constant direct current. During the cathodic deposition $Mn(OH)_2 \bullet Pb(OH)_2$ is formed. The electrodes were then cycled in a 9M KOH solution with either sintered nickel or nickel wire as the counter electrode and Hg/HgO as the reference electrode. FIG. 6 shows a cyclic voltammogram curve for cathodically prepared $Mn(OH)_2 \bullet Pb(OH)_2$ in 9M KOH. The cathodically-deposited material showed good cycling capabilities over more than 300 cycles and still continuing. Good rechargeability and regeneration of capacity was shown by taking the electrodes to cathodic potentials. No initial activation cycling was required and the material was obtained with full rechargeability. The materials had a higher discharge potential which should lead to higher battery potentials during discharge.

EXAMPLE 5

Figure 7:
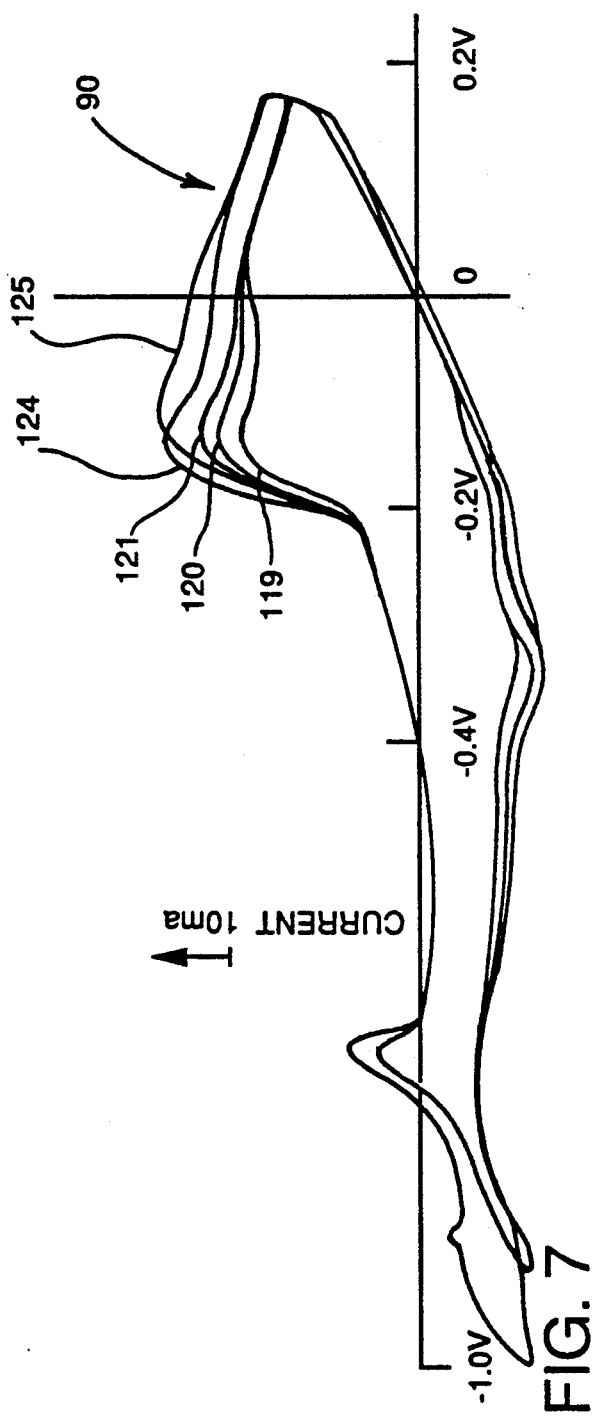
FIG. 7 is a voltammogram curve for several cycles of anodically prepared $MnO_2 \bullet PbO_2$ in accordance with the method of the present invention.

A mixture of $Mn(NO_3)_2$ and $Pb(NO_3)_2$ was used to deposit a mixture of Mn and Pb oxides onto sintered nickel or nickel wire substrates. An anodic deposition was carried out using a constant direct current. During the anodic deposition $MnO_2 \bullet PbO_2$ formed. The electrode was then cycled in 9M KOH solution with either sintered nickel or nickel wire as the counter electrode and Hg/HgO as the reference electrode. FIG. 2 shows curve 90 which is a cyclic voltammogram of anodically prepared $MnO_2 \bullet PbO_2$. The anodically deposited material showed good cycling capabilities. These cycling capabilities were obtained over more than 125 cycles and still recharging. More specifically, in this graph the cycles are shown separately. For example, reference character 119 designates to the curve for the 119th cycle. Reference character 120 refers to the 120th cycle. Reference character 121 refers to the 121st cycle. Reference characters 124 and 125 refer to cycle number 124 and 125. It should be noted that no initial activation cycle was required and the material was obtained with full rechargeability. The materials have a high discharge potential which leads to higher battery potentials during discharge. The deposited material had a peak couple at $0.0/-0.2$ v, as shown in the set of curves 90 in FIG. 7.

One advantageous use of this material made in accordance with the method of the present invention is in a battery cell. A battery container would be provided with a positive electrode and a corresponding spaced apart negative electrode both placed in a suitable electrolyte. The battery housing would then be sealed in a manner such that the positive and negative electrodes are electrically connected together.

It should be understood that the material prepared by the method of the present invention has the advantage of being highly rechargeable and of low cost. Furthermore, good rechargeability and regeneration of capacity is provided by both the cathodically and the anodically prepared materials. This is particularly shown in the anodically prepared material. The method is simple and can be performed in a very short period of time. Therefore, it should be understood that the method and material so prepared provide a solution to the longstanding problem of achieving highly rechargeable modified manganese dioxide and other types of manganese-containing materials. In addition, the method provides for simultaneous generation of materials in both the discharge and the charged state. The materials can be readily used as positive electrode materials for a primary battery cell.

Whereas particular embodiments of the invention have been described for purposes of illustration, it will be appreciated by those skilled in the art that numerous variations of the details may be made without departing from the invention as described in the appended claims.

What is claimed is:

1. A method of making a modified manganese-containing battery electrode material including the steps
    mixing manganese nitrate with a doping material having the properties of exhibiting stability in alkaline electrolytes and being chemically reactive in a potential range wherein said doping material undergoes electron transfer in said potential range;
    placing said mixture in an aqueous solution to create an electrolyte solution;
    submerging an anode and a cathode in said electrolyte solution;
    passing a current through said anode and said cathode to facilitate an electrolytic reaction resulting in a first modified manganese-containing compound being deposited on said anode, and a second modified manganese-containing compound being deposited on said cathode; and collecting said first modified manganese-containing compound from said anode.

2. The method of claim 1 including
selecting said doping material from the group consisting of lead nitrate, bismuth nitrate, copper nitrate, copper sulfate, lead acetate and mixtures thereof.

3. The method of claim 1 including said doping material undergoing said electron transfer at a potential difference which ranges between about $-0.2$ v to $-0.6$ v with reference to a Hg/HgO reference electrode.

4. The method of claim 1 including
collecting said second modified manganese-containing compound from said cathode.

5. The method of claim 2 including
employing said doping material in an amount of between about 0.1 and 5 percent of said mixture of manganese nitrate and said doping material on a molar ratio basis.

6. The method of claim 1 wherein said doping material is nitric acid.

7. The method of claim 1 including
providing as said anode a graphite rod submerged in graphite powder.

8. The method of claim 1 including
selecting said anode and said cathode from the group consisting of carbon, graphite, nickel, sintered nickel, titanium and lead.

9. The method of claim 1 including
passing said current through said anode and said cathode at a level of about 0.1 ma/cm$^2$ to 200 ma/cm$^2$.

10. The method of claim 1 including
passing said current through said anode and said cathode at a level of about 1 ma/cm$^2$ to 100 ma/cm$^2$.

11. The method of claim 9 including
passing said current through said anode and said cathode for about 1 to 170 hours.

12. The method of claim 2 including
selecting lead nitrate as said doping material, and providing lead nitrate in said mixture of manganese nitrate and said doping material in an amount of between about 0.1 to 5 percent of said mixture on a molar ratio basis.

13. The method of claim 2 including
selecting bismuth nitrate as said doping material and providing bismuth nitrate in said mixture of manganese nitrate and said doping material in an amount of between about 0.1 to 5 percent of said mixture on a molar ratio basis.

14. A method of making modified manganese dioxide of the formula PbO$_2$•MnO$_2$, including the steps of
providing an anode and a cathode,
submerging said anode and said cathode into an electrolyte solution consisting of distilled water, Mn(NO$_3$)$_2$, Pb(NO$_3$)$_2$ and HNO$_3$,
passing a current between said anode and said cathode to facilitate electrolysis, and
collecting PbO$_2$•MnO$_2$ from said anode.

15. The method of claim 14 wherein
said anode is composed of a graphite rod submerged in graphite powder, and said PbO$_2$•MnO$_2$ is collected as a mixture with said graphite powder.

16. The method of claim 15 wherein said electrolyte includes about 5M Mn(NO$_3$)$_2$, and about 0.05M Pb(NO$_3$)$_2$, and about 0.2M HNO$_3$.

17. The method of claim 16 including
passing a current through said anode and cathode of at least about 20 ma.

18. The method of claim 16 including passing said current through said anode and cathode for at least about 60 hours.

19. A method of making modified manganese dioxide of the following formula: PbO$_2$•Bi$_2$O$_3$•MnO$_2$, including the steps of:
providing an anode and a cathode,
submerging said anode and said cathode into an electrolyte solution consisting of distilled water, Mn(NO$_3$)$_2$, Pb(NO$_3$)$_2$, Bi(NO$_3$)$_2$ and HNO$_3$,
passing a current between said anode and said cathode to facilitate electrolysis, and
collecting PbO$_2$•Bi$_2$O$_3$•MnO$_2$ from said anode.

20. The method of claim 19 wherein
said anode is composed of a graphite rod and said cathode is composed of a graphite rod.

21. The method of claim 19 wherein said electrolyte solution includes about 3M Mn(NO$_3$)$_2$, about 0.05M Pb(NO$_3$)$_2$, and about 0.05M Bi(NO$_3$)$_2$ and about 0.2M HNO$_3$.

22. The method of claim 19 including
passing a current through said anode of at least about 30 ma.

23. The method of claim 19 including
passing said current through said anode and said cathode for at least about 80 hours.

24. A method of making a modified manganese dioxide compound of the formula MnO$_2$•Bi$_2$O$_3$, including the steps of:
providing an anode and a cathode,
submerging said anode and said cathode into an electrolyte solution consisting of distilled water, Mn(NO$_3$)$_2$, Bi(NO$_3$)$_2$ and HNO$_3$,
passing a current through said anode and said cathode to facilitate electrolysis, and
collecting said MnO$_2$•Bi$_2$O$_3$ from said anode.

25. The method of claim 24 including passing a current through said anode and said cathode of between about 0.1 ma/cm$^2$ and 200 ma/cm$^2$.

26. A method of making a modified manganese-containing material of the formula Mn(OH)$_2$•Pb(OH)$_2$ including the steps of
providing an anode and a cathode,
submerging said anode and said cathode into an electrolyte solution consisting of distilled water, Mn(NO$_3$)$_2$, Pb(NO$_3$)$_2$ and HNO$_3$,
passing a current through said anode and said cathode to facilitate electrolysis, and
collecting said Mn(OH)$_2$•Pb(OH)$_2$ from said cathode.

27. The method of claim 26 including
passing a current through said anode and cathode of between about 0.1 ma/cm$^2$ and 200 ma/cm$^2$.

28. A method of making a manganese-containing material of the formula Mn(OH)$_2$•Bi(OH)$_3$ including the steps of
providing an anode and a cathode,
submerging said anode and said cathode in an electrolyte solution consisting of distilled water, Mn(NO$_3$)$_2$, Bi(NO$_3$)$_2$ and HNO$_3$,
passing a current through said anode and said cathode to facilitate electrolysis, and
collecting said Mn(OH)$_2$•Bi(OH)$_3$ from said cathode.

29. The method of claim 28 including
passing a current through said anode and cathode of between about 0.1 ma/cm$^2$ and 200 ma/cm$^2$.

30. A method of making a manganese-containing material of the formula $Mn(OH)_2 \cdot Pb(OH)_2 \cdot Bi(OH)_3$ including the steps of providing an anode and a cathode submerging said anode and said cathode in an electrolyte solution consisting of distilled water, $Mn(NO_3)_2$, $Bi(NO_3)_2$ and $HNO_3$, passing a current through said anode and said cathode to facilitate electrolysis, and collecting said $Mn(OH)_2 \cdot Pb(OH)_2 \cdot Bi(OH)_3$ from said cathode.

31. The method of claim 30 including passing a current through said anode and cathode of between about 0.1 ma/cm² and 200 ma/cm².

32. A rechargeable, anodically deposited material having the formula $$MnO_2 \cdot X$$

where X is selected from the group consisting of $PbO_2$, $Bi_2O_3$, $PbO_2 \cdot Bi_2O_3$ and mixtures thereof.

33. The material of claim 32 wherein X is a mixture of $PbO_2$ and $Bi_2O_3$.

34. A rechargeable, cathodically deposited material having the formula $$Mn(OH)_2 \cdot Y$$

where Y is selected from the group consisting of $Pb(OH)_2$, $Bi(OH)_3$, $Pb(OH)_2 \cdot Bi(OH)_3$, and mixtures thereof.

35. The material of claim 34 wherein Y is a mixture of $Pb(OH)_2$ and $Bi(OH)_3$.

36. A rechargeable battery cell comprising a battery housing, a positive electrode composed of an anodically deposited modified manganese-containing material having the formula $MnO_2 \cdot X$, disposed within said housing, and wherein X is selected from the group consisting of $PbO_2$, $Bi_2O_3$, $PbO_2 \cdot BiO_3$ and mixtures thereof, a negative electrode disposed within said housing in spaced relationship to said positive electrode, a separator disposed between said positive and said negative electrode, an electrolyte contained within said housing in contact with said positive electrode and said negative electrode, and means for elecrically connecting said positive electrode to said negative electrode.

37. A rechargeable battery cell comprising a battery housing, a positive electrode composed of an anodically deposited modified manganese-containing material having the formula $MnO_2 \cdot X$, disposed within said housing, wherein X is a mixture of $PbO_2$ and $Bi_2O_3$, a negative electrode disposed within said housing in spaced relationship to said positive electrode, a separator disposed between said positive and said negative electrode, an electrolyte contained within said housing in contact with said positive electrode and said negative electrode, and means for electrically connecting said positive electrode to said negative electrode.

38. A rechargeable battery cell comprising a battery housing, a positive electrode composed of a cathodically deposited modified manganese-containing material having the formula $Mn(OH)_2 \cdot Y$, disposed within said housing, and wherein Y is selected from the group consisting of $Pb(OH)_2$, $Bi(OH)_3$, $Pb(OH)_2 \cdot Bi(OH)_3$ and mixtures thereof, a negative electrode disposed within said housing in spaced relationship to said positive electrode, a separator disposed between said positive and said negative electrode, an electrolyte contained within said housing in contact with said positive electrode and said negative electrode, and means for electrically connecting said positive electrode to said negative electrode.

39. A rechargeable battery cell comprising a battery housing, a positive electrode composed of a cathodically deposited modified manganese-containing material having the formula $Mn(OH)_2 \cdot Y$, disposed within said housing, and wherein Y is a mixture of $Pb(OH)_2$ and $Bi(OH)_3$, a negative electrode disposed within said housing in spaced relationship to said positive electrode, a separator disposed between said positive and said negative electrode, an electrolyte contained within said housing in contact with said positive electrode and said negative electrode, and means for electrically connecting said positive electrode to said negative electrode.

40. A method of preparing rechargeable battery electrode materials comprising simultaneously making a first modified manganese-containing compound having a charged state and said first compound including manganese dioxide modified with a doping material and a second modified manganese-containing compound having a discharged state said second compound including manganese hydroxide modified with a doping material, including the steps of:

providing an anode and a cathode;

submerging said anode and said cathode in an electrolyte solution consisting of distilled water, manganese nitrate and said doping material; and passing a current through said anode and said cathode to produce an electrolytic reaction resulting in the deposition of said first modified manganese-containing compound on said anode and the deposition of said second modified manganese-containing compound on said cathode.

41. A method of preparing rechargeable battery electrode materials comprising simultaneously making a first modified manganese-containing compound having a charged state and said first compound including manganese dioxide modified with a doping material and second modified manganese-containing compound having a discharged state said second compound including manganese hydroxide modified with a doping material, including the steps of:

providing an anode and said cathode in an electrolyte solution consisting of distilled water, manganese nitrate and selecting said doping material from the group consisting of lead nitrate, bismuth nitrate, copper nitrate, copper sulfate, lead acetate, and mixtures thereof;

passing a current through said anode and said cathode to produce an electrolytic reaction resulting in the deposition of said first modified manganese-containing compound on said anode and the deposition of said second modified manganese-containing compound on said cathode.

42. The method of claim 41 wherein said doping material is $Pb(NO_3)_2$, said electrolyte solution further includes $HNO_3$, said first modified manganese-containing compound is $MnO_2 \bullet PbO_2$ and said second modified manganese-containing compound is $Mn(OH)_2 \bullet Pb(OH)_2$.

43. The method of claim 42 wherein said doping material further comprises $Bi(NO_3)_2$, said first modified manganese-containing compound is $PbO_2 \bullet Bi_2O_3 \bullet MnO_2$, and said second modified manganese-containing compound is $Mn(OH)_2 \bullet Pb(OH)_2 \bullet Bi(OH)_3$.

44. The method of claim 41, wherein said doping material is $Bi(NO_3)_2$, said electrolyte solution further includes $HNO_3$, said first modified manganese-containing compound is $MnO_2 \bullet Bi_2O_3$ and said second modified manganese-containing compound is $Mn(OH)_2 \bullet Bi(OH)_3$.

45. The method of claim 41 wherein said electrolytic reaction is performed at ambient temperature and pressure.

* * * * *

UNITED STATES PATENT AND TRADEMARK OFFICE
CERTIFICATE OF CORRECTION

PATENT NO. : 5,250,374
DATED : October 5, 1993
INVENTOR(S) : Chaojiong Zhang

It is certified that error appears in the above-indentified patent and that said Letters Patent is hereby corrected as shown below:

Column 1, line 29, "=" should be --a--.

Claim 5, column 9, line 19, "0.1 and 5" should read --0.1 to 5--.

Column 11, line 49, "elecrically" should read --electrically--

Claim 41, column 12, line 60, after "anode" the following should be inserted --and a cathode; submerging said anode--.

Signed and Sealed this

Twenty-ninth Day of November, 1994

Attest:

BRUCE LEHMAN

Attesting Officer

Commissioner of Patents and Trademarks